(12) United States Patent
Takarich

(10) Patent No.: US 12,287,047 B2
(45) Date of Patent: Apr. 29, 2025

(54) HYPERBOLOID (CONCAVE) BELLOWS

(71) Applicant: Hyspan Precision Products, Inc., Chula Vista, CA (US)

(72) Inventor: Zoltan Takarich, La Jolla, CA (US)

(73) Assignee: Hyspan Precision Products, Inc., Chula Vista, CA (US)

( * ) Notice: Subject to any disclaimer, the term of this patent is extended or adjusted under 35 U.S.C. 154(b) by 248 days.

(21) Appl. No.: 17/972,613

(22) Filed: Oct. 25, 2022

(65) Prior Publication Data

US 2023/0129472 A1    Apr. 27, 2023

Related U.S. Application Data

(60) Provisional application No. 63/272,214, filed on Oct. 27, 2021.

(51) Int. Cl.
| | |
|---|---|
| *F16L 11/15* | (2006.01) |
| *F01N 13/08* | (2010.01) |
| *F01N 13/16* | (2010.01) |

(52) U.S. Cl.
CPC .............. *F16L 11/15* (2013.01); *F01N 13/08* (2013.01); *F01N 13/16* (2013.01)

(58) Field of Classification Search
CPC .. F01N 2470/12; F01N 13/08; F01N 13/1816; F01N 2450/20; F16L 11/15; F16L 27/1004; F16L 27/11; F16L 51/025
See application file for complete search history.

(56) References Cited

U.S. PATENT DOCUMENTS

| | | | |
|---|---|---|---|
| 5,480,194 A | | 1/1996 | Mantoan |
| 5,806,899 A | * | 9/1998 | Norikawa ........... F01N 13/1816 285/299 |
| 7,264,280 B2 | * | 9/2007 | Kim ...................... F16L 27/111 285/226 |
| 2012/0118858 A1 | * | 5/2012 | Li ..................... H01H 33/66238 218/139 |
| 2023/0129472 A1 | * | 4/2023 | Takarich ................. F01N 13/16 138/121 |

OTHER PUBLICATIONS

PCT International Search Report & Written Opinion dated Jan. 31, 2023, Application No. PCT/US22/47632.

* cited by examiner

*Primary Examiner* — Anthony Ayala Delgado
(74) *Attorney, Agent, or Firm* — The Dobrusin Law Firm, PC

(57) ABSTRACT

The hyperboloid (or concave) exhaust bellows includes a plurality of convolutions of varying heights arranged in a hyperboloid (or concave) configuration. The hyperboloid bellows has increased strength and resiliency in high stress environments due to the hyperboloid configuration of the convolutions. The hyperboloid bellows allows for increased lateral movement in the same axial space or envelope compared to the prior art. The hyperboloid bellows having the hyperboloid shaped expansion joint produces an excessive amount of lateral motion using a single ply to multiplies metal expansion joint bellows.

15 Claims, 5 Drawing Sheets

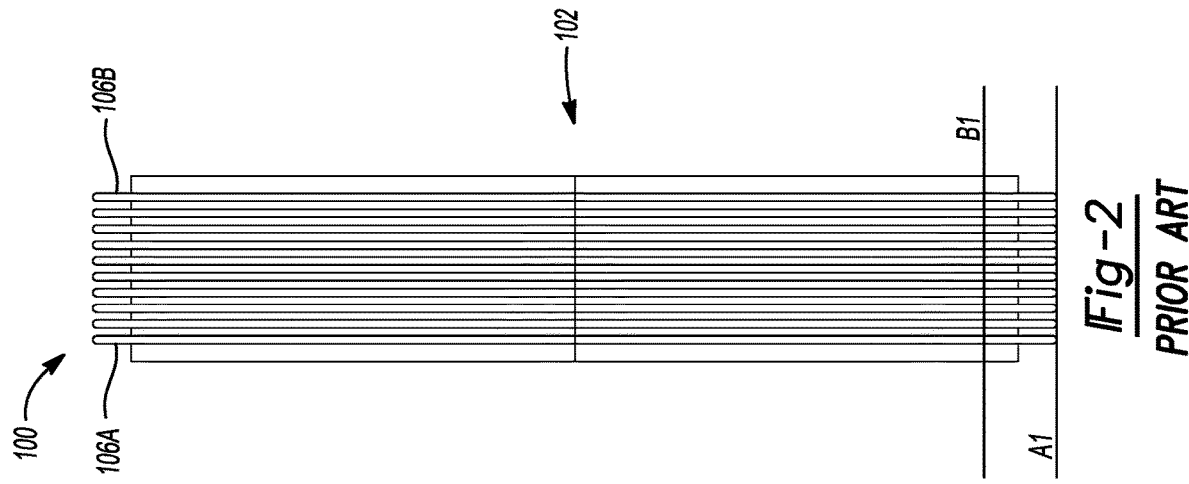
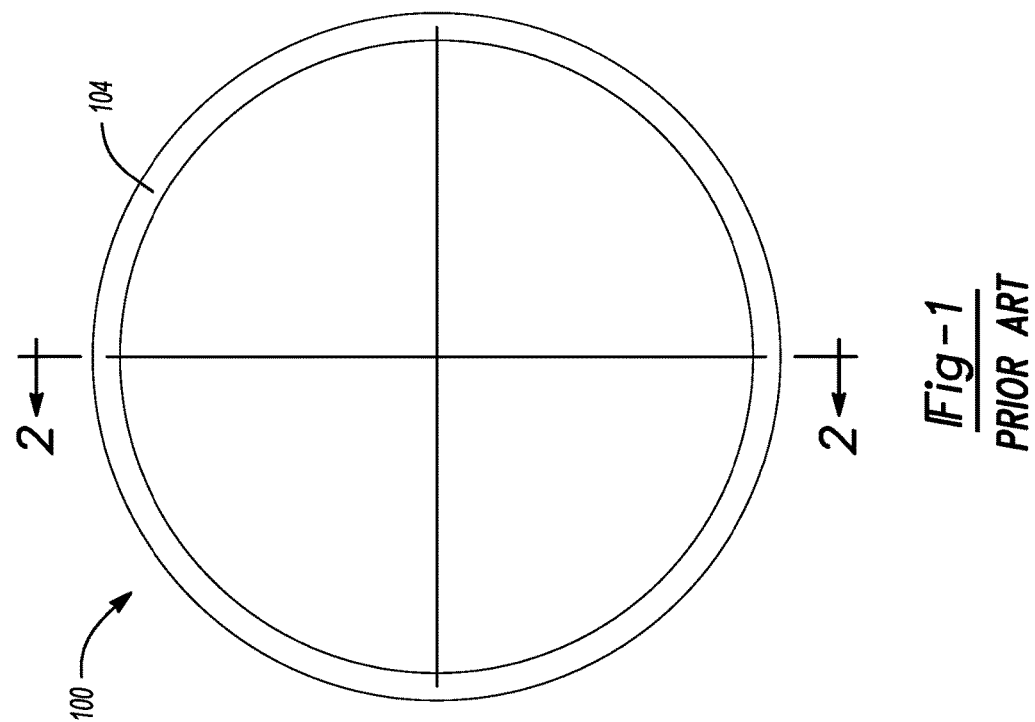

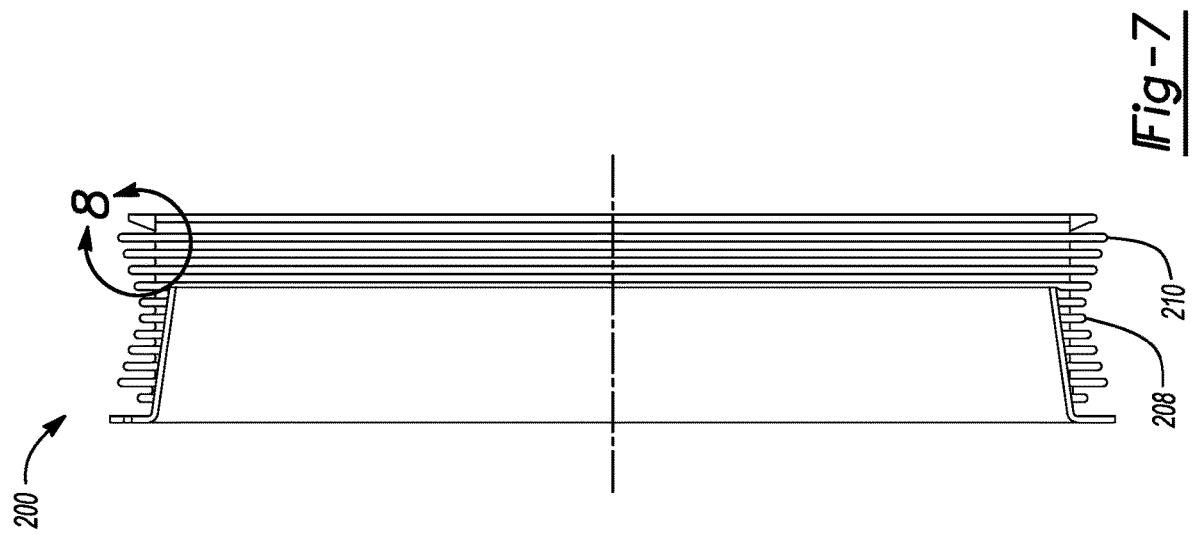
_Fig-7_
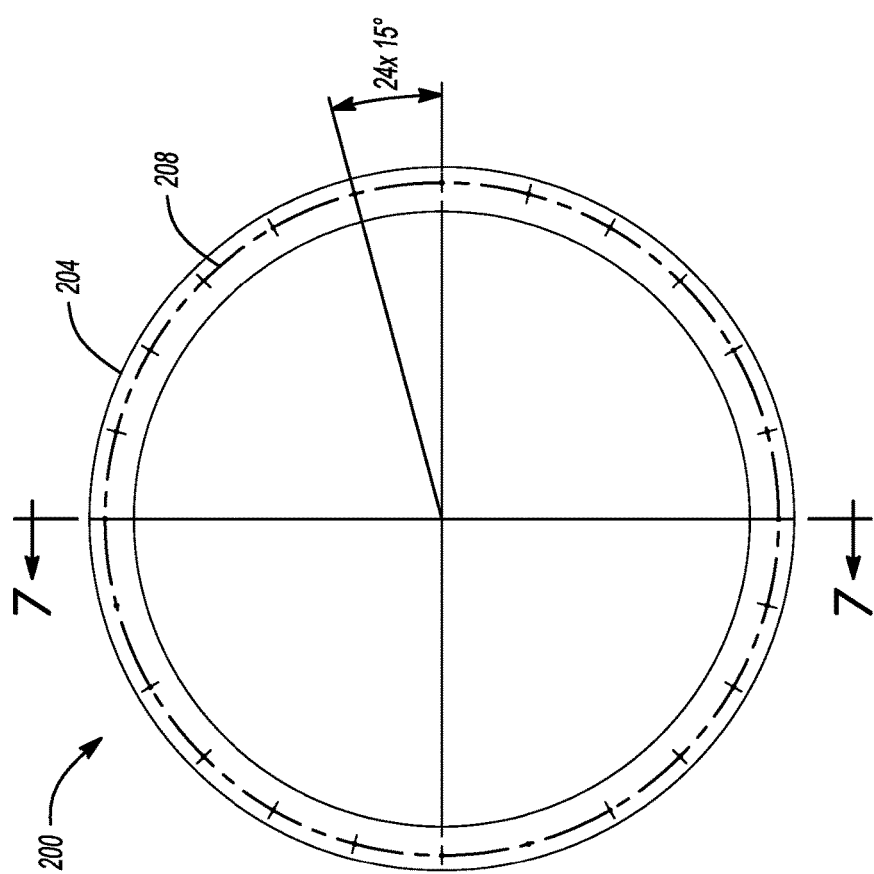
_Fig-6_

HYPERBOLOID (CONCAVE) BELLOWS

CROSS REFERENCE TO RELATED APPLICATIONS

This application claims priority and benefit to Provisional Patent Application Ser. No. 63/272,214 filed on Oct. 27, 2021.

TECHNICAL FIELD

The present specification generally relates to bellows and, more specifically, an exhaust bellows with an improved life span allowing for increased mobility.

BACKGROUND

In a typical application, the bellows component is the flexible element of an expansion joint. Formed metal bellows are made from tubing by the application of internal pressure only. The convolutions are formed in parallel planes that are perpendicular to the longitudinal centerline of the bellows, commonly referred to as annular. The tubing is normally made from sheet or coil that is rolled into a tube and longitudinally welded. Exhaust bellows are designed to absorb heat induced expansion and contraction of pipe systems and exhaust systems. However, traditional exhaust bellows often are not robust enough to tolerate high stress environments such as automobiles and aircraft (with high g-forces), for example.

Accordingly, there exists a need in the art to provide an improved exhaust bellows overcoming the aforementioned disadvantages. Traditional bellows which have uniform convolution height lack flexibility when the convolution length is very limited especially for lateral movement.

SUMMARY

Disclosed herein is a hyperboloid shaped bellows. The hyperboloid shaped bellows provides for increased strength and resiliency in high stress environments. The hyperboloid bellows allows for increased lateral motion (0.248") over straight standard bellows (0.075") design, and an increase in Cycle Life by a factor of 14 to 1 with concurrent motion using the ANSYS FEA. The improved structure provides for improved performance during motion and expansion (expansion and contraction). The hyperboloid bellows allows for increased lateral movement in the same axial space or envelope compared to the prior art. The hyperboloid bellows having the hyperboloid shaped expansion joint produces an excessive amount of lateral motion using a single ply to multi-plies metal expansion joint bellows.

A bellows for use in an exhaust system, the bellows having a first opening and a second opening, both the first opening and the second opening configured to connect to the exhaust system, and a plurality of convolutions extending between the first opening and the second opening, the plurality of convolutions varying in height, the plurality of convolutions arranged to form a curved plane, the curve plane being concave in shape, wherein the plurality of convolutions extending in heights provide for increased lateral movement in the same axial space compared to a bellows without convolutions varying in height. In some embodiments, the bellows is comprised of a single ply metal. In other embodiments, the bellows is comprised of a multi-ply metal. The convolutions may gradually vary in height. In some configurations, the convolutions become shorter towards a center portion of the bellows. The convolutions may increase in height towards the first opening of the bellows. The convolutions may increase in height towards the second opening of the bellows thereby forming a concave shape. The convolutions may increase in height towards the second opening of the bellows.

A bellows for use in an exhaust system, the bellows having a first opening and a second opening, both the first opening and the second opening configured to connect to the exhaust system, and a plurality of convolutions extending between the first opening and the second opening, the plurality of convolutions varying in height, the plurality of convolutions arranged to form a curved plane, the curve plane being hyperboloid in shape, wherein the plurality of convolutions extending in heights provide for increased lateral movement in the same axial space compared to a bellows without convolutions varying in height. In some embodiments, the bellows is comprised of a single ply metal. In other embodiments, the bellows is comprised of a multi-ply metal. The convolutions may gradually vary in height. In some configurations, the convolutions become shorter towards a center portion of the bellows. The convolutions may increase in height towards the first opening of the bellows. The convolutions may increase in height towards the second opening of the bellows thereby forming a concave shape. The convolutions may increase in height towards the second opening of the bellows.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which:

FIG. 1 depicts a side view of a prior art exhaust bellows as disclosed herein according to one or more embodiments shown and described herein;

FIG. 2 depicts an alternate side view of a prior art exhaust bellows as disclosed herein according to one or more embodiments shown and described herein;

FIG. 6 depicts a cross sectional view of an exhaust bellows as disclosed herein according to one or more embodiments shown and described herein;

FIG. 7 depicts a side view of an exhaust bellows as disclosed herein according to one or more embodiments shown and described herein;

DETAILED DESCRIPTION

Figure 3:
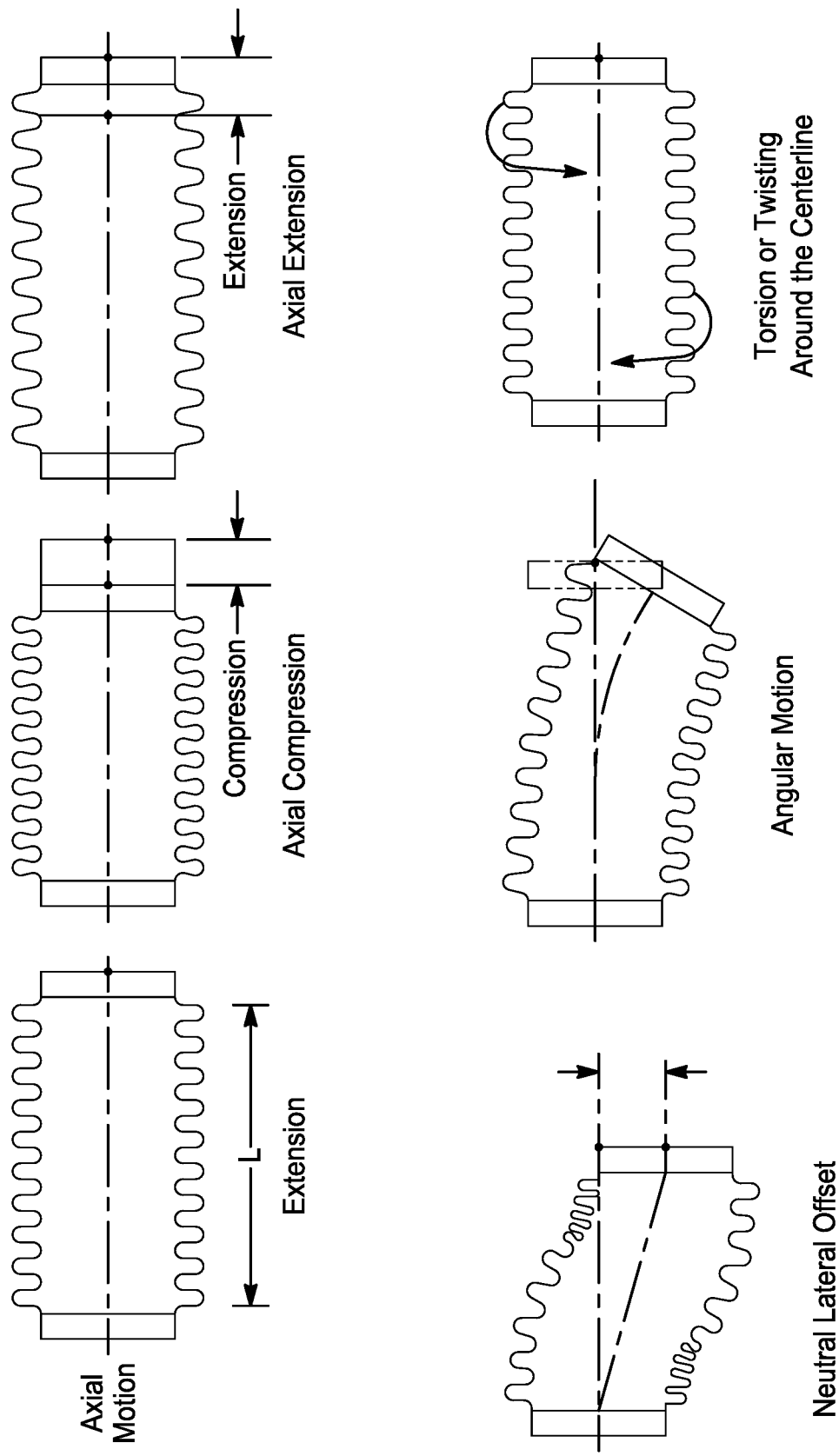
FIG. 3 depicts an illustration of bellows movement in use situations as disclosed herein according to one or more embodiments shown and described herein.
Figure 5:
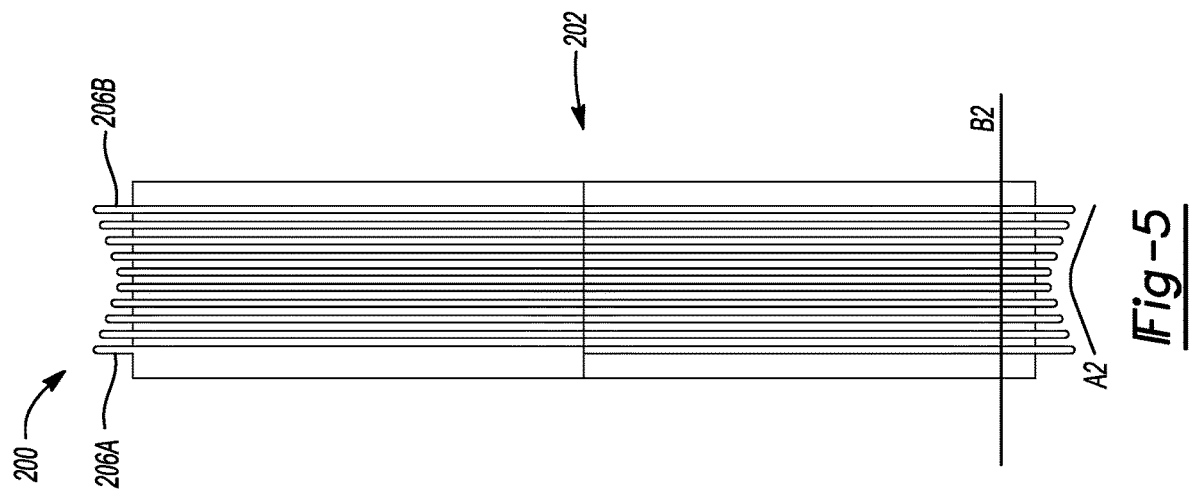
FIG. 5 depicts an alternate side view of an exhaust bellows as disclosed herein according to one or more embodiments shown and described herein.
Figure 4:
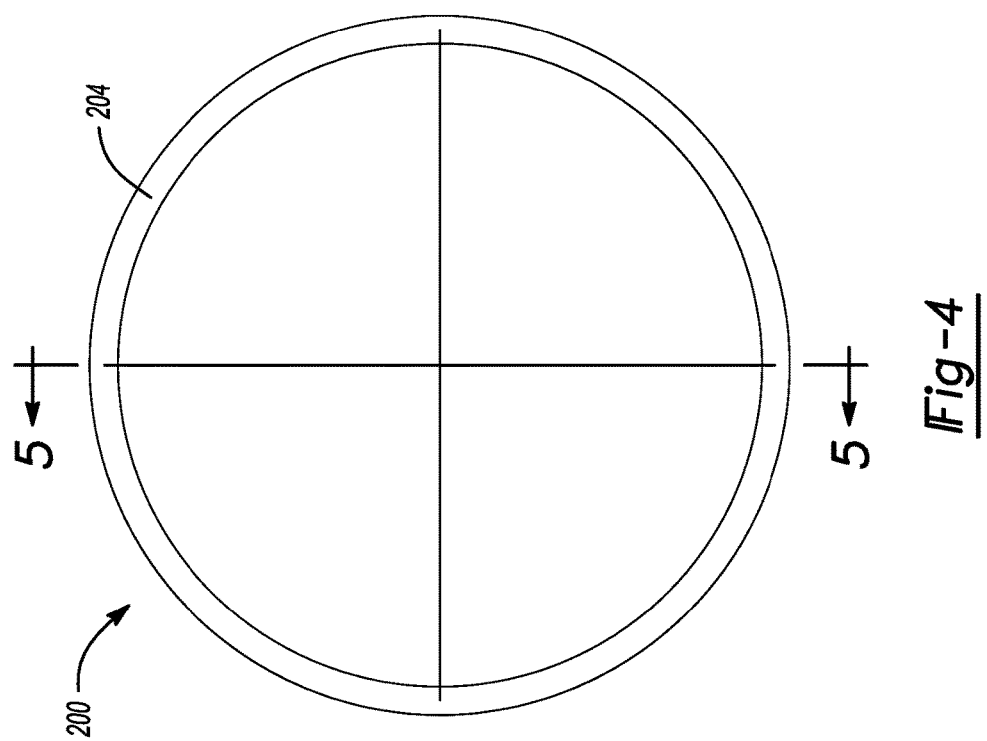
FIG. 4 depicts a side view of an exhaust bellows as disclosed herein according to one or more embodiments shown and described herein.
Figure 8:
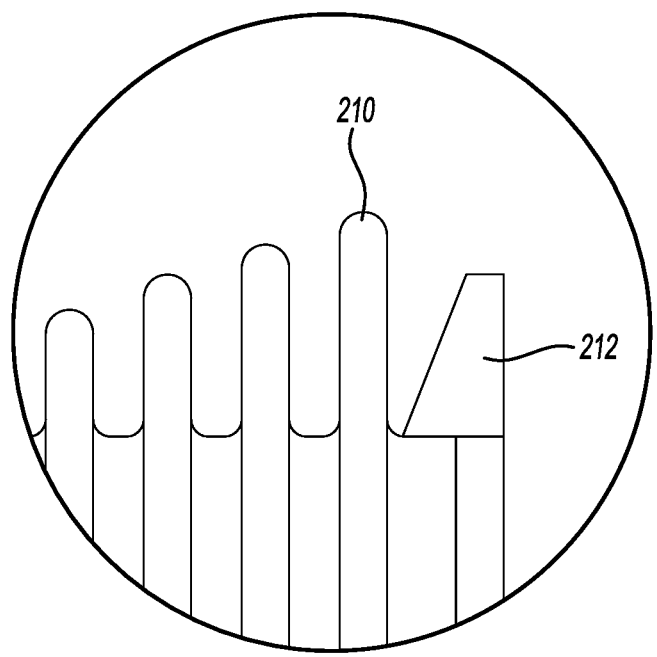
FIG. 8 depicts a close-up partial side view of an exhaust bellows as disclosed herein according to one or more embodiments shown and described herein.

The hyperboloid bellows as illustrated in FIGS. 4-9 of the present provides for a bellows having increased strength and resiliency in high stress environments. The hyperboloid bellows allows for increased lateral motion (0.248") over straight standard bellows (0.075") design, and an increase in Cycle Life by a factor of 14 to 1 with concurrent motion using the ANSYS FEA. The improved structure provides for improved performance during motion and expansion (expansion and contraction). The hyperboloid bellows allows for increased lateral movement in the same axial space or envelope compared to the prior art. The hyperboloid bellows having the hyperboloid shaped expansion joint produces an excessive amount of lateral motion using a single ply to multi-plies metal expansion joint bellows.

Referring now to FIGS. 4-9, a hyperboloid bellows 200 is disclosed. The hyperboloid bellows 200 includes a tube opening 203 and an outer circumference 204. The hyperboloid bellows 200 includes a plurality of convolutions 206A, 206B . . . etc. having different heights arranged in a hyperboloid configuration. In the present embodiment, a convolution 208 is shorter than a convolution 210 wherein the convolutions disposed between the convolution 208 and the convolution 210 form a partial hyperboloid shape. The shape between the two tallest convolutions (as indicated at points X and Y) form a hyperboloid type shape if a surface was applied thereto.

The convolutions 206A, 206B are all varying in height. The convolutions extend between the ends of the tube. At each end, connection points 212 and 214 are positioned to connect to the exhaust system.

The hyperboloid shape formed by the convolutions is generally concave and curved in nature. A hyperboloid is a quadric surface, that is, a surface defined as the zero set of a polynomial of degree two in three variables. Among quadric surfaces, a hyperboloid is characterized by not being a cone or a cylinder, having a center of symmetry, and intersecting many planes into hyperbolas.

Figure 9:
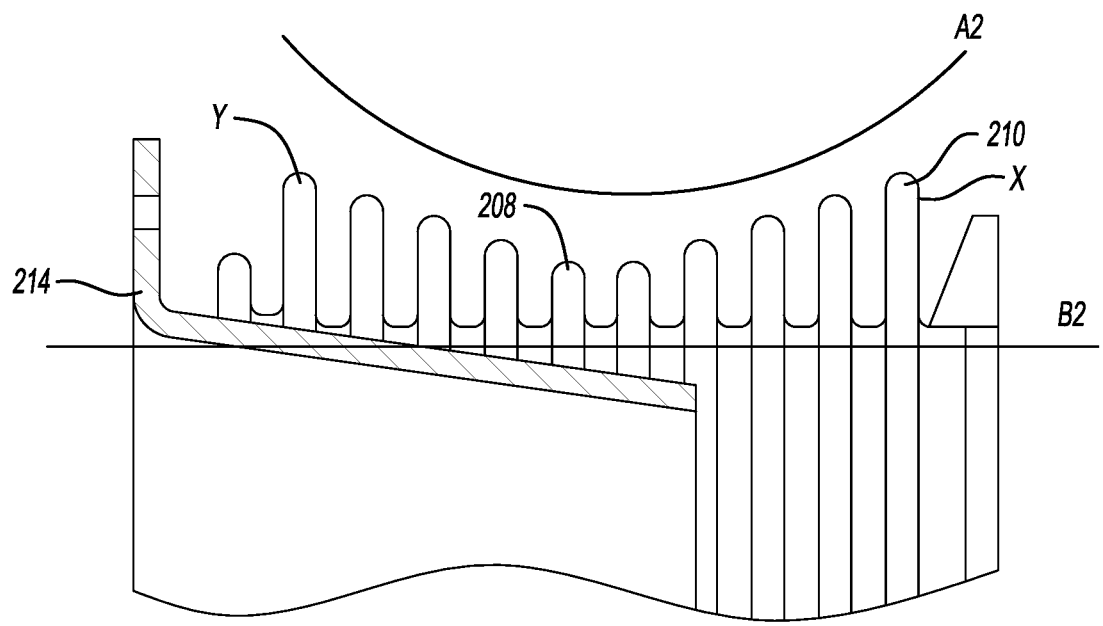
FIG. 9 depicts a close-up partial side view of an exhaust bellows as disclosed herein according to one or more embodiments shown and described herein.

In this embodiment, the hyperboloid shape is illustrated at curved plane A2 (as shown in FIG. 9) with reference to flat plane B2. This plane A2 is defined by the distalmost point on each of the convolutions. In sharp contrast to the prior art (A1 in FIG. 2), the plane of the hyperboloid bellows 200 is curved and in a generally hyperboloid or curved shape. The curved plane A2 of the present disclosure is an advantage over the prior art as it significantly improves performance as comparted to the flat plane A1 of the prior art. The flat plane A1 of the prior art is defined by the plurality of convolutions 106A, 106B all being the same height and in parallel with the plane B1. The prior art bellow includes the tube opening 102 and the outer circumference where the convolutions 106A, 106B are positioned and formed thereon.

The improved structure provides for improved performance during motion and expansion (expansion and contraction). Shock and vibration tests performed on the hyperboloid bellows 200 demonstrate life cycles 16+ times longer than the standard bellows as illustrated in the prior art of FIGS. 1 and 2.

FIG. 3 illustrates the bellows movement during testing and during normal use. The exhaust bellows 200 undergoes axial motion testing which is extension and/or compression of the bellows along the longitudinal centerline (x-axis) with the ends remaining parallel. The motion in this movement is absorbed by all convolutions. Lateral or offset motion is the displacement of the ends perpendicular to the longitudinal centerline with the ends plates remaining parallel. The longitudinal centerline is shaped into a compound curve with the convolutions deformed in a similar manner. During both movements, the hyperboloid bellows 200 performed 16+ times longer as compared to the prior art.

It is noted that the terms "substantially" and "about" may be utilized herein to represent the inherent degree of uncertainty that may be attributed to any quantitative comparison, value, measurement, or other representation. Any values that may be modified by such terminology are also part of the teachings herein. For example, if a teaching recited "about 10," the skilled person should recognize that the value of 10 is also contemplated.

These terms are also utilized herein to represent the degree by which a quantitative representation may vary from a stated reference without resulting in a change in the basic function of the subject matter at issue.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

As used herein the terms "polymer" and "polymerization" are generic, and can include either or both of the more specific cases of "homo-" and copolymer" and "homo- and copolymerization", respectively.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims (and/or any future claims filed in any Utility application) cover all such changes and modifications that are within the scope of the claimed subject matter.

What is claimed is:

1. A bellows for use in an exhaust system, the bellows comprising:
    a first opening and a second opening, both the first opening and the second opening configured to connect to the exhaust system; and
    a plurality of convolutions extending between the first opening and the second opening, the plurality of convolutions varying in height, the plurality of convolutions arranged to form a curved plane, the curve plane being concave in shape along the entire length of the bellows;
    wherein the plurality of convolutions extending in heights provide for increased lateral movement in the same axial space compared to a bellows without convolutions varying in height.

2. The bellows of claim 1 wherein the bellows is comprised of a single ply metal.

3. The bellows of claim 1 wherein the bellows is comprised of a multi-ply metal.

4. The bellows of claim 1 wherein the convolutions gradually vary in height.

5. The bellows of claim 4 wherein the convolutions become shorter towards a center portion of the bellows.

6. The bellows of claim 4 wherein the convolutions increase in height towards the first opening of the bellows.

7. The bellows of claim 6 wherein the convolutions increase in height towards the second opening of the bellows thereby forming a concave shape.

8. The bellows of claim 4 wherein the convolutions increase in height towards the second opening of the bellows.

9. A bellows for use in an exhaust system, the bellows comprising:
    a first opening and a second opening, both the first opening and the second opening configured to connect to the exhaust system; and
    a plurality of convolutions extending between the first opening and the second opening, the plurality of convolutions evenly spaced along the entire length of the bellows, the plurality of convolutions varying in height, the plurality of convolutions arranged to form a curved plane, the curve plane being hyperboloid in shape;
    wherein the hyperboloid bellows is not restrained in motion;
    wherein the plurality of convolutions extending in heights provide for increased lateral movement in the same axial space compared to a bellows without convolutions varying in height.

10. The bellows of claim 9 wherein the bellows is comprised of a single ply metal.

11. The bellows of claim 9 wherein the bellows is comprised of a multi-ply metal.

12. The bellows of claim 9 wherein the convolutions gradually vary in height.

13. The bellows of claim 12 wherein the convolutions become shorter towards a center portion of the bellows.

14. The bellows of claim 12 wherein the convolutions increase in height towards the first opening of the bellows.

15. The bellows of claim 14 wherein the convolutions increase in height towards the second opening of the bellows thereby forming a concave shape.

* * * * *